UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

INNERSOLE-FILLER.

No. 861,555.     Specification of Letters Patent.     Patented July 30, 1907.

Application filed May 15, 1905, Serial No. 260,557. Renewed December 26, 1906. Serial No. 349,443.

*To all whom it may concern:*

Be it known that I, ANDREW THOMA, a citizen of the United States, residing at Cambridge, in the county of Suffolk and State of Massachusetts, have invented an Improvement in Innersole-Fillers, of which the following description, in connection with the accompanying drawings, is a specification, like letters on the drawings representing like parts.

In the manufacture of certain kinds of shoes, a cementitious filler is employed, as, for example, in Goodyear welt shoes, the cavity in the under side of the innersole is ordinarily leveled up even with the welt surface by filling it in with ground cork mixed with rubber cement, said composition being applied in a plastic condition and the shoes then left on the racks until it has set, when the outer sole is then applied and the shoe is properly finished. Rubber cement (consisting of a solution of rubber in naphtha) is used, as it is the only cement known to the trade which will stick to leather. This filler of cork and rubber cement is exceedingly slow in drying, and in humid weather it seems exceedingly difficult to get it to dry or set, so that as a result a large amount of floor space and a great many racks are required for holding the shoes while waiting for the filler to set, the work of the shop is materially delayed, and a large amount of stock is consequently held up; also, this filler keeps on drying until it becomes porous and brittle.

My invention aims to obviate the foregoing objections, and accordingly my invention includes a filler and a method of applying it which expedite shoe manufacture, save the enormous amount of waste and loss which now result from the use of the rubber cement above referred to, produce a firm, tenacious filler layer which never alters in character, and is cheap and expeditious and does not deteriorate by standing.

In the process of shoe manufacture it usually results that the leather to which the filler is to be applied is wet or damp, as it has previously been soaked to render it pliable for turning up the usual peripheral lip thereof, and this condition, and the more or less oily and peculiar nature of leather, have rendered the problem exceedingly difficult, so that, notwithstanding the fact that rubber cement dries slowly, is liable to stick to everything in its vicinity, remains sticky even after it has set, is very expensive, and rapidly evaporates, yet said rubber cement filler has always been used. I have discovered, however, that by rendering properly plastic the resinous residuum of petroleum, having the characteristics of "wax tailings", and applying the same hot to ground cork, ground leather scrap or the like filler substance, as heretofore used for fillers, a filler is obtained which will adhere with extreme firmness and tenacity even to wet leather. It will set quickly, and yet not become hard, and can be readily handled for purposes of transportation and manufacture and the like. Also it is permanently flexible or pliable, and is non-inflammable. This latter feature is of great practical value, as it entirely does away with the menace of the present highly inflammable rubber cement filler.

I take the resinous residuum of petroleum of the kind stated, and render it properly plastic elastic by the addition of a very small amount of paraffin oil, it being understood that more oil is required in winter than in summer to offset the different conditions of temperature. I have not been able to establish any rule as to the amount of oil required, because the petroleum residuum varies greatly, it being impossible to obtain it of uniform quality. However, all that is necessary is to get said resinous residuum of petroleum into a plastic condition by any means sufficiently so that it is moldable or workable penetrating and sticky, having about the consistency of a cheese and being capable of being cut with a knife like a cheese. It is sometimes obtainable of just the right consistency, not requiring any tempering, but usually it is either too thin (*i. e.*, too fluid) or too thick (*i. e.*, too stiff), so that it has to be brought to the right condition of plasticity or elasticity. Having mixed the ground cork or ground leather scrap thoroughly with his compound (heated to a fluid condition), it may be allowed to set *en masse*, in which condition it is only slightly pliable, although not hard. In this condition it can readily be transported in a crate or in a convenient wrapper, to the various factories.

One advantage of the wax tailings or resinous residuum of petroleum is that the filler produced thereby has no disagreeable odor, a feature which is essential in shoe manufacture. Also it has a low melting point (to which is largely due its capacity for quick-setting) and hence there is no danger of charring the cork, and repeated melting does not alter its character. As already noted, the resinous residuum of petroleum from different oil fields differs very decidedly, but it may readily be brought to substantial uniformity by supplying any deficiency, as, for instance, if lacking in resinous qualities, resin may be added, thereby also stiffening the same, it being important not to materially modify the distinguishing characteristics of the residuum, such as its unchangeableness, quick setting, its capacity when united with the cork to make a permanently elastic filler, its waterproof and non-inflammable qualities, etc. In my Patent No. 808,224 I have set forth more at length the advantages thereof from the shoe manufacturer's standpoint. When it is desired to apply it to the innersole or other place, the desired quantity for the job in hand is cut off from the larger bulk of the compound and is heated. A hot tool, or a tool dipped in hot oil, is then preferably used for applying it to the leather, said tool molding or forcing and smoothing the heated plastic compound down evenly in the cavity of the innersole which is being filled. This is accomplished instantly, as the heated filler is perfectly plastic and fluid while hot, and remains moldable when cold. The filler, as thus applied, sets quickly but does not harden, one minute being sufficient in the ordinary atmosphere. When once set, the filler does not alter with age, does not become brittle, but remains pliable and tenacious, and also adheres firmly to the leather. It will be understood that the body of ground or comminuted material may consist of any usual or suitable fragmentary substance capable of having all its separate particles or pieces entirely and permanently coated simply by mixture with the resinous compound. These particles or granules may be of varying sizes, so that the filler resembles a mass of chunks of coated cork, leather or the like held together by the intervening film of plastic coating compound. This compound consists of the cork granules and a pliable binder normally semi-solid, but rendered temporarily semi-liquid by heat. Each granule of the cork is coated as slightly as possible, but yet entirely, with an elastic, always sticky, non-oxidizing or unchangeable coating, which is capable of sticking to leather under all conditions, especially when hot, but is capable of being compressed only when cold. It is applied hot to save work and power and to promote its adhesion to the leather, especially when the latter is damp. It cannot be compressed when hot, but is then readily moldable and flows or shifts freely in the presence of the hot tool, and as soon as it sets it can be compressed, so that it facilitates the laying of the sole in the bottoming process. When it cools it "sets" in the sense that the free-flowing condition ceases because of the toughening of the binder, whose adhesion to the cork becomes firm and strong the moment it becomes cold, but the filler never gets hard and it always remains pliable and comparatively soft and moldable. It is quick-setting in the sense of stiffening at once upon cooling, quick-setting being due to the stiffening of the binder as it cools. It is non-oxidizing in the sense of being unchangeable in character, i. e., permanently workable, not becoming brittle and losing its stickiness as does the naphtha-rubber cement filler already mentioned.

It is obvious that there is no special danger from fire, and as the normal condition of the filler is more or less hard or doughy, there is no tendency thereof to run, leak, evaporate, smear the floor with drippings, etc., which are among the disagreeable previous conditions which it is the purpose of my invention to obviate.

One of the leading features of my invention resides in providing a filler which is normally in its ultimate plastic, non-oxidizable condition and requires to be heated or otherwise specially treated at the moment of its application in order to render it capable of being applied, as distinguished from being normally fluid and semi-liquid and always smeary and requiring a long period of time in which to attain its ultimate set condition.

My filler is quick setting and yet is permanently plastic, by which term I mean that it is freely compressible when cold but not so as to be free-moving or shifting, as its particles hold or adhere to each other as distinguished from the two extremes of being fluid and being brittle. It is non-shifting in that it cannot break up, separate or disintegrate, so as to hump up locally in the shoe. When cold it holds tenaciously together in a permanently plastic, moldable body. Having secured this result, it will be seen at once that most of the objections to the present system have disappeared, as they are mostly due to the semi-fluid slow acting condition of the rubber cement which sets only after the naphtha has evaporated.

As already intimated, my compound and the mode of application may be varied considerably without departing from the spirit and scope of my invention, especially as defined in the following claims. For instance, I intend the claims to cover the filler whether mixed or prepared a long time prior to use or a short time prior to use or just as inserted or placed in the shoe. The present case, however, is subordinate to my co-pending application, now Patent No. 832,002 granted September 25, 1906, in which I have placed the broad claims which are generic to the several different varieties of shoe filler or filler material and compounds, the present case being restricted to that species of my filler which depends upon the resinous residuum of petroleum or sticky wax tailings.

Having described my invention, what I claim as new and desire to secure by Letters Patent, is:

1. A shoe-bottom filler consisting of a non-oxidizing, permanently plastic, quick-setting mass composed of finely comminuted filler material having each granule thinly coated with a permanently sticky binder containing resinous residuum of petroleum in a waxy condition.

2. A shoe-bottom filler consisting of a non-oxidizing, permanently plastic, quick-setting comparatively odorless mass composed of finely comminuted filler material having each granule thinly coated with a permanently sticky binder containing resinous residuum of petroleum in a waxy condition.

3. A shoe-bottom filler, consisting of a filler body in a fragmentary condition thoroughly mixed with a binder containing wax tailings of petroleum and a modifying agent so compounded as to render the mixed filler mass permanently elastic, pliable and tenacious as described, yet sufficiently stiff to prevent shifting or bunching in the shoe bottom and to be self-sustaining for transportation.

4. A shoe-bottom filler, consisting of a normally unchangeable, permanently elastic, quick-setting mass of finely comminuted cork tenaciously held together by a binder whose controlling ingredient is resinous residuum of petroleum.

5. A shoe bottom filler, consisting of a low melting, non-oxidizing, permanently elastic and quick-setting mass containing resinous residuum of petroleum.

6. A shoe bottom filler, consisting of a normally unchangeable, permanently elastic, quick-setting, non-inflammable, water-repellent mass pliable and tenacious as described, yet stiff in the shoe to prevent shifting or bunching in use, and containing sticky residuum of petroleum.

In testimony whereof, I have signed my name to this specification, in the presence of two subscribing witnesses.

ANDREW THOMA.

Witnesses:
GEO. H. MAXWELL,
M. A. JONES.